DEMODULATION SYSTEM

Filed June 14, 1968

Inventor
NORMAN W. PARKER

BY Mueller, Aichele & Rauner

ATTYS.

United States Patent Office 3,535,438
Patented Oct. 20, 1970

3,535,438
DEMODULATION SYSTEM

Norman W. Parker, Wheaton, Ill., assignor to Motorola, Inc., Franklin Park, Ill., a corporation of Illinois Filed June 14, 1968, Ser. No. 737,174
Int. Cl. H04n 9/50
U.S. Cl. 178—5.4 6 Claims

ABSTRACT OF THE DISCLOSURE

The upper sideband of the I modulation components of a color television signal is restored by modulating with a signal of twice the color subcarrier reference frequency. A color signal demodulator operates on the luminance components, the usual double sideband Q modulation components and the reformed, full frequency range, double sideband I modulation components to form red, blue and green representative signals for maximum color resolution.

BACKGROUND

The color subcarrier of the NTSC type television signal is quadrature modulated by so-called I and Q signals. These are interleaved with the high frequency portion of the Y or luminance signal. The I signals represent the orange-cyan colors which appear to the eye with maximum acuity. The Q signals are in quadrature to the I signals and are modulated in double sideband over approximately 500 kHz., while the I signals are modulated in a lower sideband over approximately 1.5 mHz. To conserve spectrum and remain compatible with the 4.5 mHz. sound subcarrier the I modulation has an upper sideband from the subcarrier at 3.58 mHz. only as high as the Q signal modulation, that is to approximately 4.1 mHz. The lower sideband of the I modulation extends from the subcarrier frequency down to around 2 mHz.

Most color television receivers commonly available today use only the double sideband portion of the I and Q modulation so that as much as 1 mHz. of color video information, to which the I is most sensitive, is not reproduced. This avoids cross talk as well as problems and cost in processing these multiplexed signals. It is of course known to separately select the I and Q modulation bands and demodulate these to reproduce all of the transmitted color detail. However the circuitry to do this is complicated and expensive since filters of different bandwidths with different time delay characteristics and amplitude responses are needed. A relatvely expensive delaying device has been required for the Q signal modulation to compensate for the lesser delay in its filter compared to the delay of the I signal filter. These circuits have also generally required matrix circuitry for combining proper amplitudes and phases of the demodulated I and Q signals to produce actual red, blue and green color representative signals for reproduction by the cathode ray tube.

SUMMARY

An object of this invention is to improve the detail of a color television image.

Another object is to reduce the cost and simplify a color television receiver which reproduces the entire frequency range of the transmitted color subcarrier.

A further object is to demodulate directly red, blue and green representative color signals from full range I and Q signal information in the system, wherein delay differences of the signals of different bandwidths are avoided.

In a particular form of the invention the single sideband or two color portion of the color subcarrier is selected and modulated with the second harmonic of the subcarrier at a phase which is the so-called I, or maximum acuity, signal which represents orange and cyan. The lower sideband of this modulation together with the originally selected single sideband I portion of the subcarrier are symmetrical about the color subcarrier reference frequency. These two modulation ranges are combined with the original double sideband portion of the subcarrier which contains both the I and the Q modulation components to produce double sideband I modulation and double sideband Q modulation, with the transmitted frequency range out to approximately 1.5 mHz. for the I components and .5 mHz. for the Q components. These double sideband signals are demodulated, either to produce color difference signals for matrix with a luminance signal to make color representative signals, or preferably are demodulated with the luminance signals to directly produce the color representative signals. This wideband color system includes a disabling switch to revert to narrow band color signal operation for received signals at low level to help reduce so-called noise energy in the color signal channel and minimize colored "snow" in the picture.

DRAWING

DETAILED DESCRIPTION

Figures 1, 2, 3:
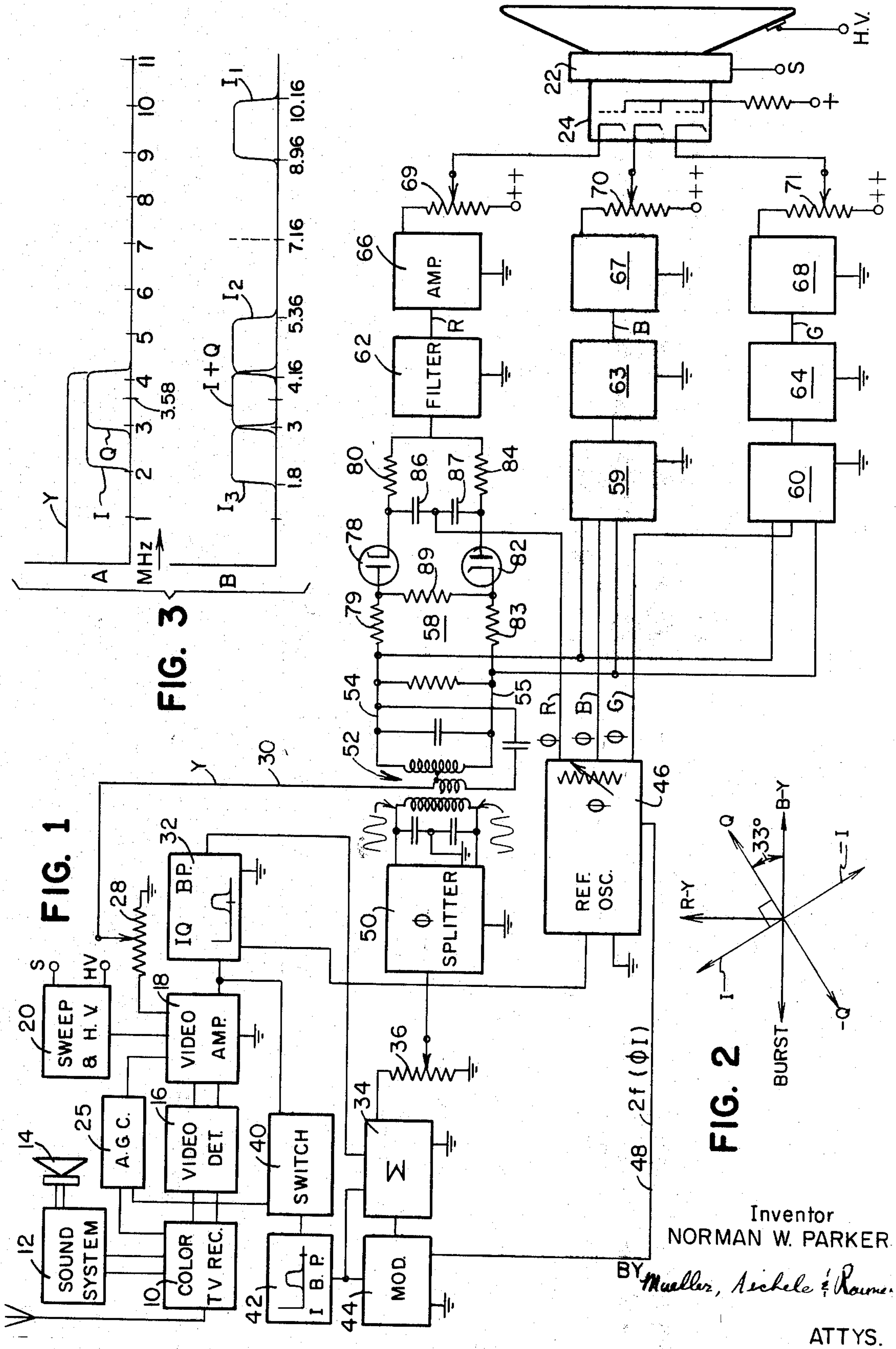
FIG. 1 is a diagram of a color television receiver incorporating the invention.
FIG. 2 is a vector diagram representing signal components of the color signal subcarrier.
FIG. 3 is a group of frequency response curves illustrating passband responses used in the demodulation system of the invention.

In FIG. 1 the color television receiver circuit 10 is coupled to an antenna to select and amplify a desired signal which is converted to intermediate frequency. The circuit 10 is also coupled to a sound system 12 which responds to the usual 4.5 mHz. sound subcarrier. The system 12 selects limits and demodulates the sound signal and amplifies it sufficiently to drive the loudspeaker 14.

The receiver circuit 10 is further coupled to a video detector 16 to demodulate the intermediate frequency video signal which is then applied to the video amplifier circuit 18. The signal in the amplifier 18 includes the usual vertical and horizontal synchronizing pulses, the video frequency brightness or Y signal, the 3.58 mHz. (approx.) modulated color subcarrier signal (suppressed carrier) and the color reference burst at 3.58 mHz. included on the trailing portion of the horizontal synchronizing pulses.

The video amplifier 18 supplies a signal to the sweep and high voltage system 20 which selects the vertical and horizontal synchronizing pulses (at 60 Hz. and 15.75 kHz.) to provide appropriate sweep signals to the deflection yoke 22 on the neck of the tri-beam cathode ray picture tube 24. The system 20 also provides high voltage for the screen of the picture tube which may be of the shadow mask type presently in common use.

The video amplifier 18 also feeds an AGC system 25, which may be of known form such as a gated type, to develop a control potential dependent upon the amplitude of the received signal. This control potential is applied to the receiver circuit 10 to adjust its gain so that a relatively constant signal level is applied to the video detector 16. Once the received signal falls below a so-called AGC threshold level, however, the AGC circuit 25 controls the receiver circuit 10 at maximum gain and any further decrease in input signal level will result in a corresponding decrease in signal input level to the video detector.

The composite video signal available in amplifier 18 is comprised of the video frequency brightness components which are in a frequency range designated Y in FIG. 3. These components extend in frequency to as high as 3 megacycles and may go over 4 megacycles. The color subcarrier is at approximately 3.58 mHz. and is a suppressed carrier. It is modulated in amplitude to represent color saturation and by so-called I and Q signals whose vectors are represented in FIG. 2. The I signal in positive phase represents the color orange and in negative phase represents the color cyan. The Q signal in positive phase represents purple and in negative phase green. As shown in FIG. 3 the Q signal is modulated double sideband with a bandwidth of approximately 500 kHz. on each side of the subcarrier. The I signal is modulated with an upper sideband approximately the same as the Q signal but with a lower sideband extending down from the subcarrier by about 1.5 mHz.

As is understood in the art the greatest sensitivity of the eye for color letail extends along the cilors of the I axis so that the bandwidth of the I modulation components is made relatively wide to provide this detail in the signal.

As shown in FIG. 2 the color signal burst which is phase locked to the frequency of the color subcarrier is transmitted at 33° lagging to the negative Q signal. The color representative signals normally used to drive the cathode ray picture tube 24 with the usual phosphors are those designated red, blue and green. These signals, when considered among the color representations of the I and Q signals are designated in FIG. 2 by $B-Y$ for the blue color difference signal, which is in opposite phase to the burst, and $R-Y$ which is the red color difference signal which is 90° ahead of the $B-Y$ signal. Similarly a $G-Y$ or green color difference signal (not shown) is in the third quadran and is a vector combination of $R-Y$ and $B-Y$ but of opposite phase.

One output of the video amplifier 18 is shown coupled to a potentiometer 28 having an arm coupled to the lead 30 running to the color signal demodulator section of the receiver. The amplifier 18 provides the luminance or Y signal which may be band selected to about 3 megacycles in order to avoid including the color subcarrier frequency. The Y signal may also be processed with known comb filter techniques in order to separate the interleaved components of the color subcarrier which are interspersed with the frequency components of the brightness signal (as shown in FIG. 3) so that the brightness signal is uncontaminatel, although this is not necessary for the operation of the invention. Similarly the color subcarrier could be processed by comb filter techniques to remove the interleaved Y components therefrom.

It is also contemplated that the amplifier 18 include a suitable delay line, in accordance with known practice, to time delay the Y signal to match the time delay of the color signal processed through narrower banl filters and thereby delayed more than the wideband filtering of the brightness signal. The techniques for thus developing the desired brightness signal on lead 30 are not further describel as these are understood in the art.

A further output of the video amplifier 18 is applied to the bandpass filter 32 which includes suitable frequency selection circuits such as a parallel tuned network, to select a band of approximately 600 kHz. on each side of the color subcarrier which would thus encompass all of the double sideband Q modulation components and that part of the I modulation components transmitted double sideband and overlapping the Q modulation components, as shown by the Q response curve of FIG. 3A. This band selected portion is coupled to an adder circuit 34 which applies the signal band to the potentiometer 36 for application to the color demodulation section of the receiver.

Many of the color television receivers in common use utilize only so much of the color signal information as provided by a bandpass circuit of the type described in connection with circuit 32 thus not utilizing that portion of the I signal modulation components falling below the lowest sideband of the Q modulation components (FIG. 3A). While this portion of the I signal range represents only two colors (orange and cyan) and the portion of the I and Q signals which are common in the modulation range represent three, or effectively all, of the colors, the I signal is along the maximum visual acuity axis and can provide significant color detail for the reproduced image.

In accordance with the invention another output of the video amplifier 18 is also fed through the switch circuit 40 (to be described subsequently) to the I component bandpass filter 42. The filter 42 is designed to have the same bandwidth and time delay as that provided by circuit 32 but its frequency range is from approximately 1.8 mHz. to 3 mHz. so that it passes only the two color range of the color subcarrier which is the lower single sideband modulation of the subcarrier by the I signal. The output of the bandpass filter 42 is applied to a balanced modulator circuit 44.

Modulator circuit 44 is also supplied with a signal from the reference oscillator 46. Oscillator 46 is fed with the burst signal separated from the received signal in accordance with known techniques in the circuit 32 and applied to the oscillator 46. This oscillator is thus phase and frequency locked with the reference of the transmitted signal. Among its outputs are signals properly phased for demodulation of red, blue and green color reresentative signals from the color subcarrier. Another output applied on lead 48 is a signal of I phase (FIG. 2) which is 57° lagging from the burst signal. The signal on lead 48 of I component phase is also at the frequency of the second harmonic of the color reference signal which would be approximately 7.16 mHz.

Accordingly with the two inputs to the modulator 44 its output applied to the adder circuit 34 will be the upper and lower I component modulation bands $I_1$ and $I_2$ of FIG. 3B. These are symmetrical around the modulating reference signal on lead 48 at 7.16 mHz., and, in the case of the original I component lower sideband $I_3$ extending between 1.8 and 3 megacycles, $I_1$ and $I_2$ will extend respectively between 8.96 and 10.16 mHz. and between 4.16 and 3.36 mHz.

Considering the sideband restoration from the mathematical standpoint, the following analysis shows how the upper I sideband signal can be restored by using the lower single sideband I components to regenerate the required signals.

(1) $E_I \cos (\omega_I t+\phi_I)$ represents a signal component between 1.8 and 3.0 mHz.

(2) $E_c \cos (\omega_{sc}t+\beta)$ is the color subcarrier signal

In these equations $\beta$ is 33°; $\phi_I$ is the instantaneous phase of the signal; $\omega_I$ is the I signal phase; $\omega_{sc}$ is the subcarrier phase; and $E_I$ and $E_c$ are peak voltages.

If Equation (1) represents the lower sideband of the color carrier of Equation (2), the color signal generated would be the difference between the color subcarrier and the sideband frequencies:

(3) $\omega_c t=(\omega_{sc}t+\beta)-(\omega_I t+\phi_I)$

Then the color sidebands would be:

(4) $E_{sc}=E_I \cos [(\omega_{sc}t+\beta)-\omega_c t]+E_I \cos [(\omega_{sc}t+\beta)+\omega_c t]$
$=E_I \cos (\omega_I t+\phi_I)+E_I \cos [2(\omega_{sc}t+\beta)-(\omega_I t+\phi_I)]$ The last term of Equation (4) indicates that the upper sideband can be derived by modulating the second harmonic of the color carrier (2) by the lower sideband I signal and taking the lower sideband component of the modultion components, thus:

(5) $E_I \cos (\omega_I t+\phi_I)\times 2 \cos [2(\omega_{sc}t+\beta)]=$
$E_I \cos [2(\omega_{sc}t+\beta)-(\omega_I+\phi_I)]+E_I \cos [2(\omega_{sc}t+\beta)(\omega_I t+\phi_I)]$ The first term of Equation (5) is the desired lower sideband component $I_2$. The second term, which is the upper sideband of the second harmonic or $I_1$, is removed by filtering in the system.

If the reference signal $2(\omega_{sc}t+\beta)$ is the second harmonic of the reference signal whose phase is along the I axis, all the signals introduced into the modulator generate complementary sidebands and become I signals which are cancelled from the output of a demodulator of Q components.

Therefore the input to adder 34 includes the components in a range $I_3$ of FIG. 3B fed either from the filter 42 or directly through the modulator 44, the double sideband portion of the color subcarrier signal designated $I+Q$ in FIG. 3B fed from the filter 32, and the upper sideband components designated $I_2$ and developed by the modulator 44. The system filters have phase and amplitude characteristics such that a smooth response is achieved without serious disruption at the transistors. Thus the signal adder 34 applies across the variable resistor 36 a double sideband form of both the I and the Q signals. It is contemplated that the adder 34 will apportion the components in the ranges $I_2$ and $I_3$ to match the amplitude of the components in the range $I+Q$ so that the quadrature I and Q signals are double sideband and of uniform amplitude throughout their transmitted range.

While it is possible to synchronously demodulate the color subcarrier signals on variable resistor 36 to derive any desired color difference signals such as $R-Y$ and $B-Y$ through appropriate synchronous detection at the proper phase angles of the subcarrier, it is preferable to decode the wideband color demodulation in a direct demodulation system which produces red, blue and green representative signals to avoid matrixing color difference signals with the brightness signal. In the system shown in FIG. 1 the wideband color subcarrier signal is applied to the phase splitter 50 which develops opposite phases of the signal in the primary of transformer 52. These signals are coupled to the secondary of transformer 52 which also carries the same phase of the Y or brightness signal from lead 30 connected to the center tap of the secondary winding.

The secondary of transformer 52 has an output lead 54 and a further output lead 55. Both of these leads carry the luminance components with respect to ground. Lead 54 carries the modulated subcarrier of one phase and lead 55 carries the modulated subcarrier of opposite phase. The leads 54 and 55 are each coupled to direct color signal demodulators 58 and 59 and 60. These demodulators respectively provide output signals to the associated filters 62, 63 and 64 which are coupled to the respective video amplifiers 66, 67 and 68. Red, blue and green representative video signals are developed by the amplifiers 66, 67 and 68 across the variable drive control resistors 69, 70 and 71. The arms of these variable resistors are coupled to the individual guns in the picture tube 24. The associated grids and cathodes of the picture tube are established with proper bias potentials in accordance with known principles so that the image is reproduced in response to the so-called R, B and G signals.

The demodulators 58, 59 and 60 are synchronously operated with signals from the reference oscillator 46. The oscillator 46 may include a phase adjustment to control hue of the reproduced image. The operation of the direct demodulator 58 for the red representative signal will be described, however it can be understood that the demodulators 59 and 60 for the blue and green representative signals function in a corresponding manner although at different phase angles of the subcarrier signal.

A first diode switch 78 is coupled in series with resistors 79 and 80 between the input lead 54 and filter 62. The second diode switch 82 is coupled in series with resistors 83 and 84 to the filter 72. A signal of proper phase for synchronous demodulation of the red representative signal is applied from the oscillator 46 through the capacitors 86 and 87 respectively to the cathode of diode 78 and the anode of diode 82. The diodes 78 and 82 are oppositely polarized and the color reference signal is applied to the diodes with the same phase. The input to the two diodes comprises opposite phases of the modulated subcarrier signal and the same phase of the brightness or Y signal. During the first half cycle of the color reference signal from oscillator 46 diode 78 will conduct and translate a portion of a luminance signal and a portion of a proper phase of the modulation information of the subcarrier represented in the full frequency range of both I and Q components to produce a signal component representing the red information at the filter 72. During the next half cycle of the color reference signal, the diode 82 will conduct on the same phase and next half cycle of the chroma subcarrier to similarly conduct a red representative signal of the filter 72. This operation amounts to full wave demodulation of the filter subcarrier signal along with gating of the associated Y signal. Filter 72 is of a low pass type to establish an upper video bandwidth and at the same time integrate the signal portions conducted through the demodulator switches.

In direct demodulators of the prior art which have produced a color representative signal representing the brightness, hue and saturation of the image there has generally been a spurious signal component introduced due to the modulation of the Y or brightness signal with the color reference signal used for synchronous demodulation of the color subcarrier signal. However in the present system the luminance signal is applied unbalanced to the demodulator switches, whereas opposite phases of the modulated subcarrier signal are applied to the switches so that spurious modulation components of the luminance at the 3.58 mHz. rate are cancelled by opposing components from the two demodulator switches. Any reference signal and luminance intermodulation components are established as modulation sidebands around the frequency of twice the reference frequency so that these are filtered by filter 72 and they fall above the frequency range of interest for good video reproduction. This demodulation system is further explained in the IEEE Transactions on Broadcast and Television Receivers, November 1967, vol. BTR 13, No. 3 at p. 77.

A resistor 89 is coupled between the series resistors 79 and 83 at the diodes 78 and 82. The resistor 89 is proportioned to establish the proper amplitude of color subcarrier at each diode through voltage divider action in conjunction with resistors 79 and 83. Since there are opposite phases of the subcarrier signal at the ends of the resistor 89 its value with respect to the value of resistors 79 and 83 will established a desired amplitude of the subcarrier signal for the diodes. The luminance signal is applied equally through the leads 54 and 55 so that this signal will be virtually unaffected by the networks 79, 83 and 89. In this way the luminance to modulated subcarrier ratio can be established in the demodulator to compensate for differences in the Y signal and the color difference signal as transmitted so that the demodulator produces a signal directly representative of color, saturation and brightness.

In the demodulators 59 and 60 the resistor corresponding to resistor 89 would have different values to compensate for the fact that different subcarrier amplitude correction is needed for signals representing different colors.

With the foregoing system the output of the direct demodulators 58, 59 and 60 results in demodulated signals representing a three color bandwidth of approximately 600 kHz. Between approximately 600 kHz. and 1.2 mHz., signals which are mixtures of the primary color signals produce a two color reproduction. Above approximately 1.2 mHz. the same monochrome signal is developed in all of the channels providing the high frequency black and white detail.

It is also possible to switch the color television receiver between narrow color signal bandwidth and wide color signal bandwidth. This can be done by controlling switch 40 to open below a given signal level under control of an appropriate signal from the AGC circuit 25. This can provide for narrow band color operation on low level signals where the additional color bandwidth might give noisy color operation, while automatically providing wideband color operation when the signal strength is adequate for relatively noise free operation. The switch 40 could also be located between the modulator 44 and the adder circuit 34 or could be responsive to a control from a source other than the AGC circuit 25. For example it could be responsive to a signal sensing the amplitude of the reference burst signal.

This color television demodulation system provides a conversion of the I signal components to double sideband form by restoring the upper sideband for full detail color image reproduction and improved picture resolution. The system avoids the cross-talk and delay devices and step filters often required in the prior art circuits handling the I and Q signals wherein the single sideband signal components had a differing bandwidth from that of the double sideband signal component. The system is particularly attractive for use with a direct demodulator wherein it is unnecessary to separately demodulate the I and Q signal components and then matrix to produce color difference signals and further matrix with the luminance signal to produce the color representative signals. With the system above described the wideband color signal can be demodulated directly with the Y signal so that red, blue and green representative signals are produced with their full transmitted frequency range.

What is claimed is:

1. A color television demodulation system for utilizing a subcarrier signal modulated in quadrature by first and second signals, the modulation thereof extending in a common sideband range about the subcarrier frequency and the modulation of the first signal also extending in a lower sideband range below the common sideband range below the common sideband range without a counterpart upper sideband range, including in combination, first circuit means for selecting components in the lower sideband range, oscillator circuit means producing a modulating reference signal phased to the first signal, a modulator circuit coupled to said first circuit means and said oscillator circuit to be under control of the modulating reference signal at twice the subcarrier frequency, to produce lower sideband components of twice the subcarrier signal frequency by the first signal, adder circuit means combining the lower sideband components of the subcarrier, the lower sideband components of the modulating reference signal at twice the subcarrier frequency and the components in the common sideband range to produce double sideband modulation for both the first and second signals with respect to the subcarrier, and demodulator circuit means coupled to said adder circuit means for recovering modulation components in the double sideband information of the first and second signals.

2. The demodulation system of claim 1 for an NTSC television signal in which said first signal is an I signal representing the colors of orange and cyan and the second signal is a Q signal.

3. The demodulation system of claim 2 in which the subcarrier signal frequency is substantially 3.58 mHz., the common sideband range is substantially 1.2 mHz. and the lower sideband range falls between substantially 1.8–3 mHz.

4. The demodulation system of claim 1 in a receiver further including circuit means producing a control voltage variable with received signal level, and switch means coupled in circuit with said first circuit means and responsive to the control voltage to disable the signal path to said adder circuit means for signal components in the lower sideband range.

5. The demodulation system of claim 1 in which said demodulator circuit means includes switching devices alternately conductive on opposite phases of the subcarrier signal, one phase of which represents a color for image reproduction, and which includes a circuit supplying a brightness signal with the same phase to each of said switch devices to directly produce a color reppresentative signal without spurious brightness signal modulation components.

6. A color television demodulation system for an NTSC signal to process I modulation components of a subcarrier signal which has a narrow band double sideband portion and a lower single sideband portion, including in combination, means modulating the lower single sideband portion with a modulating reference signal at the second harmonic of the subcarrier frequency to produce further I modulation components as the lower sideband of the modulating reference signal, means combining the narrow band double sideband portion, the lower single sideband portion and the further I modulation components to form wideband double sideband I modulation components of a frequency range encompassing the lower single sideband range, and demodulator means for utilizing the wideband double sideband I modulation components.

References Cited

UNITED STATES PATENTS

| | | | |
|---|---|---|---|
| 2,816,952 | 12/1957 | Lockhart | 178—5.4 |
| 2,908,752 | 10/1959 | Lockhart | 178—5.4 |

ROBERT L. GRIFFIN, Primary Examiner

R. L. RICHARDSON, Assistant Examiner

U.S. Cl. X.R.

329—50